United States Patent
Mowat et al.

(10) Patent No.: US 11,489,776 B2
(45) Date of Patent: Nov. 1, 2022

(54) MULTICORE OFFLOADING OF NETWORK PROCESSING (71) Applicant: Arista Networks, Inc., Santa Clara, CA (US)

(72) Inventors: J. Eric Mowat, Piedmont, CA (US); Chaitanya Lala, Santa Clara, CA (US); James Michael Murphy, Alameda, CA (US); Raj Ammanur, Los Altos, CA (US); Prasanna Panchamukhi, San Ramon, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 339 days.

(21) Appl. No.: 16/941,341

(22) Filed: Jul. 28, 2020

(65) Prior Publication Data
US 2022/0038376 A1 Feb. 3, 2022

(51) Int. Cl.
H04L 47/125 (2022.01)
H04L 47/2441 (2022.01)

(52) U.S. Cl.
CPC ........ H04L 47/125 (2013.01); H04L 47/2441 (2013.01)

(58) Field of Classification Search
CPC .................. H04L 47/125; H04L 47/2441
See application file for complete search history.

(56) References Cited

U.S. PATENT DOCUMENTS

| 9,513,814 | B1* | 12/2016 | Can | G06F 3/0647 |
| 2012/0287791 | A1* | 11/2012 | Xi | H04L 43/0882 370/237 |
| 2013/0318379 | A1* | 11/2013 | Seshadri | G06F 1/206 713/320 |
| 2017/0318082 | A1* | 11/2017 | Thakur | H04L 69/30 |
| 2018/0167461 | A1* | 6/2018 | Shen | G06F 9/5033 |
| 2019/0386913 | A1* | 12/2019 | Wei | H04L 49/1515 |

OTHER PUBLICATIONS

Han, et al., "SoftNIC: A Software NIC to Augment Hardware," Technical Report No. UCB/EECS-2015-155, UC Berkeley (2015).

* cited by examiner

Primary Examiner — Jung H Park
Assistant Examiner — Sumitra Ganguly
(74) Attorney, Agent, or Firm — Fountainhead Law Group P.C.

(57) ABSTRACT

A method for reassigning flows to cores in a multi-core network device includes receiving a packet flow and periodically determining a packet rate of the flow and the processing load on each of the worker cores. Unassigned flows are assigned to the least loaded core. If an assigned flow has a packet rate that exceeds a particular threshold proportion of the processing capacity of the currently assigned worker core, reassigning the flow to the lowest loaded worker core unless the resulting load would exceed the current load on the currently assigned worker core.

20 Claims, 8 Drawing Sheets

MULTICORE OFFLOADING OF NETWORK PROCESSING

BACKGROUND

Demands on the processing capability and flexibility of network interfaces have increased dramatically as more content becomes shared online. Complex security protocols are often used to protect the content among different devices and users. Overloading network devices with processor-intensive flows can significantly impair performance. In order to efficiently process numerous levels of security with high volumes of data, switching and routing devices have been engineered with hardware tailored to a network's particular demands. However, as network demands and configurations change, it is costly and impractical to swap out hardware components to adapt appropriately. Rather than relying on tailored hardware implementations, network devices are being developed with core hardware implemented with the flexibility provided by dynamic software technologies. Some newer network devices have multiple processing cores that can be leveraged to perform parallel processing and load balancing of incoming network packets. These multi-core platforms may be implemented with extensible software systems known as software switches or routers.

Some extensible software implementations include the Berkeley Extensible Software Switch (BESS) (available at http://span.cs.berkeley.edu/bess.html), for example. Like other software architectures, BESS provides a modularized packet-processing pipeline architecture. Various modules can be included to implement various network interface features such as a scheduling module that allocates network flows or classes of packets to particular processors. Flows or classes of packets may be based upon priority, security, or destinations (e.g., ports), for example.

A software architecture may try to allocate the flows among multiple processors as based upon, for example, priority and/or load balancing. Typically, each processor of a multi-processor architecture will be assigned packets to handle at ingress and, in order to maintain efficiency, the same processor will complete the processing of the packets/flow. This may be done in part so that caching (e.g., L1 and L2 caching) performed by the core is not interrupted/reset by a reallocation to a new core. However, demands from flows may develop or change over time, making load balancing among numerous active flows challenging. Thus, improved methods for allocating and balancing flow processing among resources are needed.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

In an aspect of some embodiments, a method balances the assignment of processing loads among multiple worker cores of a network device. The balancing is based on classifying and monitoring the processing impact of particular flows of packets received at the device. A flow may be classified, for example, by one or more processing functions that the network device is tasked with performing (e.g., encryption/decryption of packets or other high-demand tasks).

The network device may assign initial processing of flow tasks to a particular core (e.g., designated for initial ingress processing of packets received at a particular device port). The device may further assign/offload certain packet-processing flow tasks to the same or other cores. For example, before information of a flow's utilization and impact on load is ascertained, the initial offloading of these tasks may, by default, be assigned to the currently least-loaded core and/or to the core assigned to receive packets at the port from which the packets are received.

As a flow of packets is received at the device, attributes of the flow and of the cores are monitored to assess the loads on the respective cores and the relative impact of the packet flow/tasks on the loads. The monitored attributes of the packet flow and cores may include the flow packet rate (i.e., the frequency in which the particular flow of packets are received), the processing capacity of each core, and the proportion of that capacity currently being utilized by the flow.

Over time and periodically, as the monitoring is used to obtain additional information about the flow and core load attributes, a determination is made about whether processing of the offloaded tasks to their currently assigned core exceeds a particular threshold proportion of the core's processing capacity. If the threshold is exceeded, a determination is made about whether reassigning/offloading of the tasks to a different core would result in the newly assigned core's processing load being below a particular threshold processing load. In some embodiments, this threshold is the processing load of the currently assigned core, the threshold that was exceeded by the currently assigned core, or a minimum level below these amounts. In some embodiments, a core that is assessed for reassignment/offloading is the presently least-loaded core.

If it is determined that the reassignment/offloading would not cause the newly assigned core's processing load to exceed the particular threshold processing load, the new core is assigned to process/offload tasks designated for the offloading (e.g., encryption/decryption). If the reassignment/offloading would cause the newly assigned core to exceed the threshold load, then the currently assigned offloading core is maintained. The monitoring/assessment process for possible reassignment/offloading may continue while packets for the particular flow continue to be received.

In some embodiments, a rebalancing of processor loads is accomplished using a modular software system like BESS within a multi-core network device. An approach utilizes an offloading module operating on one of the cores to offload flow processing based upon the periodically monitored state of flow and core statistics. Some embodiments establish distinct modules and a topology in a software architecture to execute the balancing. The modules may be set up to allocate and rebalance flows based upon a flow category or flow class (e.g., IP Security ("ipsec") encryption or decryption) related to characteristic processing demands.

When a flow is received, an offloading module determines whether the flow task has been assigned to an offloading core. In an approach, if the flow has not been assigned, the flow is initially assigned to a core based on the least loaded worker core of the plurality of worker cores. When the offloading module encounters a flow, a packet counter which tracks the packet rate of each flow is updated. The respective states of each core are also monitored.

As a flow is encountered by the offloading module, a periodic check is also performed to determine if the flow/task should be reassigned to a different core based upon the states of the flow and separate cores. In an embodiment, the determination includes calculating whether reassigning the flow to the lowest loaded core would result in a threshold level of processing improvement. This calculation may be made based upon assuming the presently detected state of the flow and other cores would continue. Because reassigning a flow to a different core would potentially involve reordering packet processing and wasting current cache assignments in the presently assigned core, reassignment may include factoring in the potential costs.

In an approach, a determination is made of whether the flow is presently utilizing greater than a threshold proportion of the core's processing capacity (e.g., half of processing capacity). If reassigning a flow utilizing the threshold level of capacity would cause a significant level of reordering and cache redistribution, such that the eventual potential processing improvement would likely be nullified, then the flow will be maintained on the present core. If moving a flow is not ruled out on account of its utilization of the present core, the process may further calculate potential impacts on the overall system.

An estimation of potential system impact may be made by calculating the relative processing impact of the flow and what the relative impact would be on the candidate worker core if the flow were reallocated. For example, the relative impact may be calculated by dividing the number of packets per flow during a time period by the packets per worker processed during the same time period. In an embodiment, if the resulting load on the new worker would be less than the load on the current worker, the flow is reallocated. Otherwise, the flow allocation is maintained. If the flow is reallocated, the offload module is configured to direct packets to a task for processing on the new worker, including packets waiting in the offload module queue.

An approach utilizes a BESS architecture including modules for processing encryption and decryption flows. As in other software-based architectures, tunnel interfaces may be established by a control plane in BESS for different types of flows. An approach includes inserting an offloading module with an output gate connected to a tunnel chain such as an ipsec ("IP security") chain. A forwarding information base (FIB) component may be configured to direct types of flows (e.g., ipsec flows) to the offloading module. Tasks for processing (e.g., encrypting/decrypting) the particular flows may be allocated/offloaded to particular worker cores.

Figure 1A:
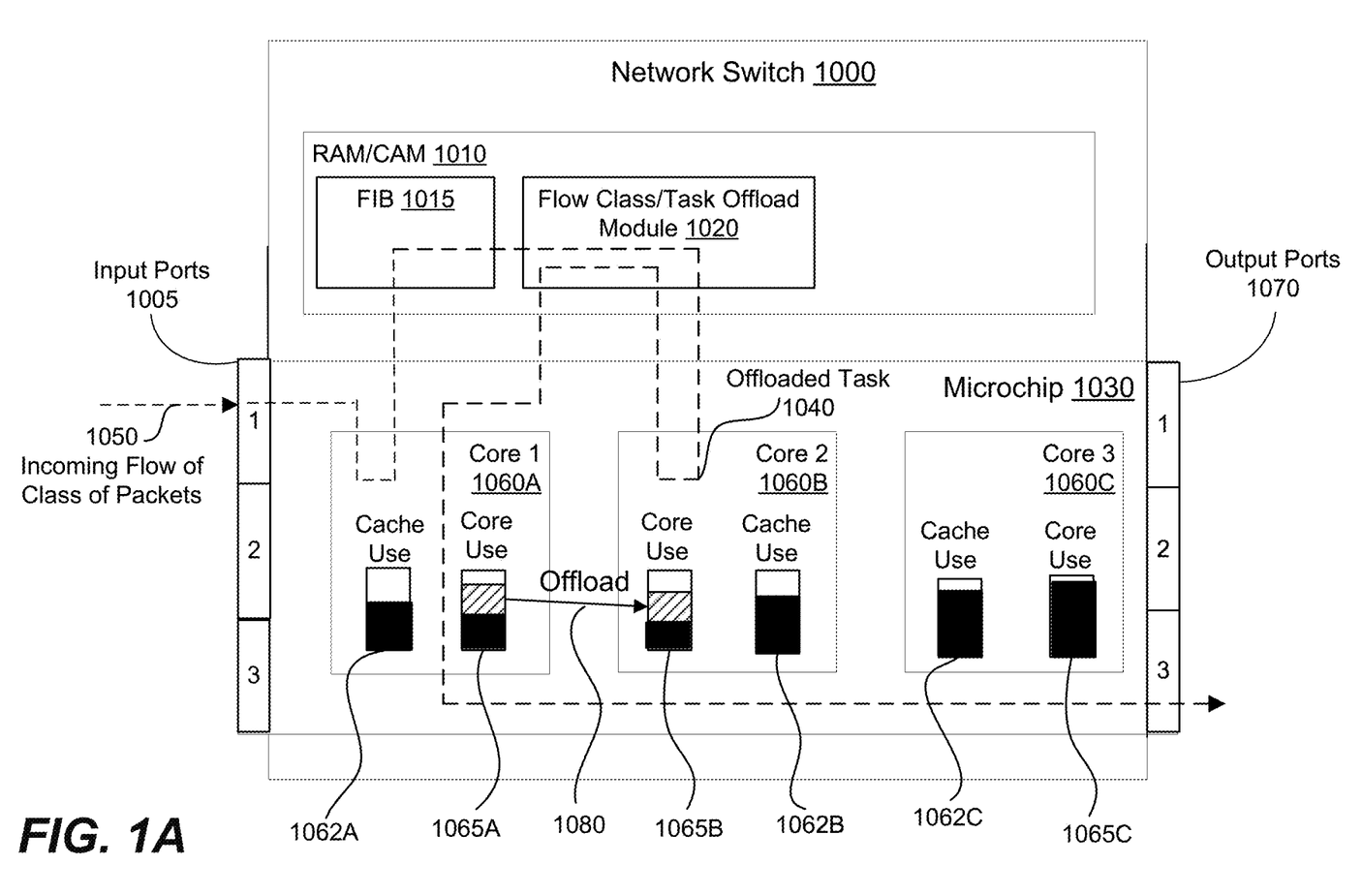
FIG. 1A is a diagram of a network switch offloading network processing tasks among multiple cores in a network device, according to some embodiments.

FIG. 1A is a diagram of a network switch 1000 offloading network processing tasks among multiple cores in a network device, according to some embodiments. Switch 1000 includes a microchip 1030 with processing cores 1060A, 1060B, and 1060C, network interface input ports 1005, and network interface output ports 1070. Network interfaces output ports 1070 may be used to communicate with other devices in a network system and/or across an internet or communication network (e.g., between multiple routers, switches, nodes, client devices).

Microchip 1030 should be understood to mean circuitry based on one or more microprocessors, microcontrollers, digital signal processors, programmable logic devices, field-programmable gate arrays (FPGAs), application-specific integrated circuits (ASICs), etc., and includes a multi-core processor (e.g., dual-core, quad-core, hexa-core, or any suitable number of cores) including cores 1060A, 1060B, and 1060C and may be distributed across multiple separate processors or processing units, for example, multiple of the same type of processing units (e.g., two Intel Core i7 processors) or multiple different processors (e.g., an Intel Core i5 processor and an Intel Core i7 processor).

Switch 1000 further includes memory storage 1010 with at least Random Access Memory (RAM) and may include content addressable memory (CAM/TCAM). Installed in memory 1010 are a software platform and memory tables for performing switch functions (e.g., packet forwarding, encryption, decryption). The memory tables include a forwarding information base (FIB) table 1015. The software may include an extensible operating system (EOS) such as Arista Network's commercially available EOS software and may include software libraries (e.g., BESS) for performing switch operations.

As described further herein, platforms including BESS provide the ability to program and instantiate software-based modules that permit pipelining of packet processing between instantiated modules such as by using chaining and tunnel interface techniques. A software-based offloading module 1020 is instantiated in memory 1010 to operate on microchip 1030.

As a group of packets 1050 are received at one of input ports 1005, they are processed by core 1060A, which may be dedicated to that port for initial ingress processing of its received packets. Initial processing includes performing lookup(s) of the packets in lookup FIB table 1015. Based on the lookup(s), the packets may be assigned to a particular flow class. For example, the lookup may assign packets to a class based on a match with certain parameters of the packets (e.g., source address, destination address, and/or other packet header fields). The offloading module 1020 is programmed to monitor the processing load of each of cores 1060A, 1060B, and 1060C. In some embodiments, a core's processing load capacity is the maximum number of packets it can process over a particular time period. For example, commands such as the "top" command from a Linux-based operating system may be used to obtain information about each CPU/core in a device and the amount of resources (e.g., processing capacity) each process is utilizing on the core. The processor load attributable to a particular flow class may be determined by counting the number of flow class packets that are received over a particular period of time. For example, counting over particular time periods may be implemented using Arista EOS packet header timestamps in accordance, for example, with the following implementation:

```
function TapaggTimestamp.dissector(buf, packet, tree)
    local t = tree:add (TapaggTimestamp, buf(0,10))
    local v = t:add(t_version, buf(0,2))
    -- 4 bytes for seconds
    local seconds = buf(2,4):uint( )
    -- 4 bytes for nanoseconds
    local nanoseconds = buf(6,4):uint( )
    -- add the raw timestamp the info column
    packet.cols.info = "TapAgg Timestamp: " ..
    seconds..".."..nanoseconds .. " "
    packet.cols.info:fence( )
    -- in the packet tree view show the time as a string
    local time = NSTime.new(seconds, nanoseconds)
    local ts = t:add(t_ts, buf(2,8), time)
    return 10
end
```

As the packets proceed through processing within switch 1000 and are counted and timestamped before and after processing through the offload module 1020, a calculation may be made to determine the number of packets that are processed over a particular period of time. In some embodiments, the attributable load may be determined/updated by calculating a running average over time of the processing demands created by the flow class.

Based on the classification of packets 1050, they are further processed using offload module 1020 configured to allocate the processing of particular tasks (e.g., encryption/decryption) for the respective class of packets among multiple cores 1060A, 1060B, and 1060C. Deployment of an offloading module may be based on the level of processing particular identifiable tasks require (e.g., those that require relatively high levels of processing). Offload module 1020 is programmed to select a core for executing the particular tasks, which may be selected based on the core through which the packets were initially processed before they were assigned a class and/or based on the currently least-loaded core. The least loaded core may be determined such as by using the core load monitoring described herein.

As further packets 1050 of the particular class are received, monitoring of the core loads continues as well as monitoring a proportion of the load attributable to the particular class. For example, programming in the offloading module or another connected module may track the overall traffic processed by a core and determine the proportion of the traffic assigned to the particular class such as described above. Charts 1065A, 1065B, and 1065C illustrate percent core use for respective cores 1060A, 1060B, and 1060C. In some embodiments, cache use (e.g., L1 or L2 cache use) for respective cores is also tracked and illustrated by charts 1062A, 1062B, and 1062C. This may be performed by using such commands as "sudo su -c "free -h && sync && echo 3>/proc/sys/vm/drop_caches && free -h" on a Linux-based system.

As packets 1050 of the class are received, an analysis is performed comparing the load of the currently assigned core to other cores of switch 1000. In some embodiments, if the load of the assigned core exceeds a particular threshold, and other cores do not exceed those thresholds, a determination is made of whether re-assigning processing of the class to another core would provide an improved balance of load among processors in view of the potential costs (e.g., clearing L1 and L2 caches of the currently assigned core/ class and restarting caching for the class in a new core). In some embodiments, an analysis of cache use (e.g., as represented in charts 1062A, 1062B, and 1062C) is used to determine the relative costs of reassigning a class to a new core. For example, if the cache use for the class is low, then the lower cost of reassignment is factored into determining that the class processing should be reassigned.

When a determination of a balancing benefit is made for offloading to a new core, the offloading module 1020 reassigns processing tasks (e.g., encryption/decryption) for the class to the new core. In an example, offloading module 1020 determines that a portion of the processing load (e.g., for encryption/decryption) for packets 1050 on core 1060A should be reassigned to core 1060B. The result of the rebalancing is illustrated at 1080.

After the offloaded task/processing for the packets 1050 of the particular class is completed on core 1060B, final processing of the packets 1050 may be completed at the core of ingress (core 1060A) before a packet resulting from the processing (e.g., encrypted/decrypted) is forwarded through an output port 1070.

In some embodiments, a process is performed to determine particular flow tasks that utilize relatively high levels of core capacity. For example, it may be determined that a particular module in a flow processing chain (e.g., in a BESS-based system) utilizes a relatively high percentage of core capacity. Identifying high usage tasks may be dynamically determined such as by implementing the commands described above to monitor processor usage for particular modules and/or sections of executable code. When such high demand/usage is identified, packet flows that utilize such modules/code may be dynamically classified and implemented using offloading modules such as described herein. In some embodiments, a machine learning system is implemented to identify and classify high demand/usage packet flows.

In some embodiments, particular flows of packets previously classified for offloading may be declassified if the system determines that the flows no longer demand a high level of core usage. This may be performed, for example, by monitoring flow demands and relative core usage over time as described herein. In some embodiments, particular flow classes may be attributed a priority level with respect to other flow classes. For example, information from packet headers may be used to identify packet flows with particular priority levels. In such instances, a determination may be made that other lower-priority flow classes will not be offloaded for sharing core resources with higher priority flow classes so as to avoid potential interference with the higher-priority flow processing tasks.

Other embodiments as discussed herein may be implemented using network devices in accordance with switch 1000. For example, instructions in accordance with the processes of FIGS. 1-5 and 7 described herein may be stored in storage 1010, and executed by microchip 1030 of device 1000. The instructions for performing the embodiments of processing multi-core offloading may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). Microchip 1030 executes instructions for execution of offloading modules and/or other processing functions stored in memory (e.g., memory 1010). The instructions may be stored in either a non-volatile memory (e.g., flash memory) and/or a volatile memory (e.g., RAM) and loaded into microchip 1030 at the time of execution. A system for generating modules and offloading processing tasks (e.g., described in reference to FIGS. 1-5) may be a stand-alone application implemented on the multi-core network device 1000 and/or distributed across multiple devices (e.g., utilizing BESS or another software defined network platform).

Figure 1B:
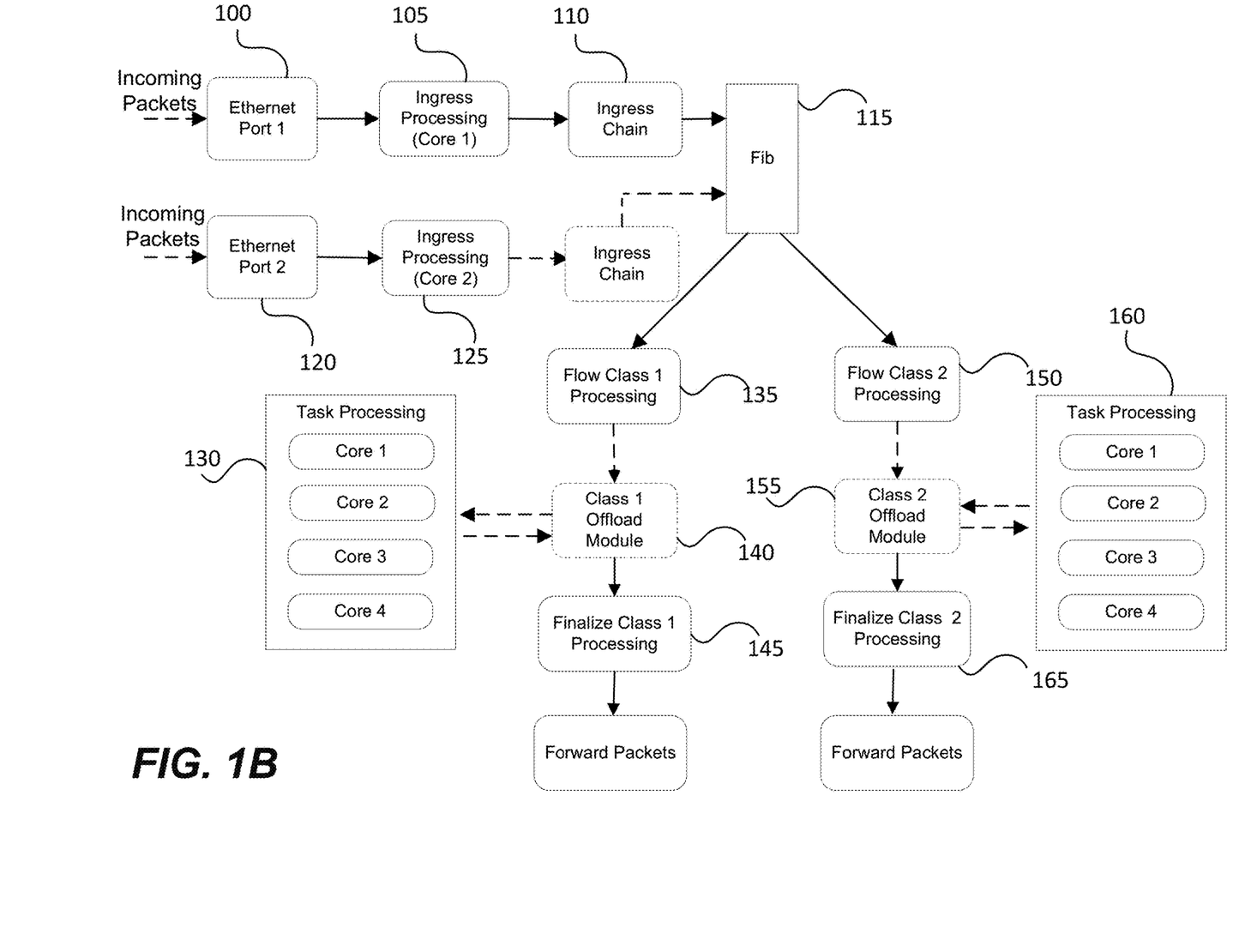
FIG. 1B is a flowchart of offloading network processing tasks among multiple cores in a network device, according to some embodiments.

FIG. 1B is a flowchart of offloading network processing among multiple cores in a network device, according to some embodiments. Block 100 represents a module of a software platform for processing incoming packets at an ethernet port (port 1) of the network device. At block/module 105, the traffic received at the ethernet port, which may not yet be assigned to any particular class, is initially processed by a first processing core among four cores (Core 1, Core 2, Core 3, and Core 4). Block/module 110 represents an ingress chain module directing the processing of received packets through the port by a forwarding information base (FIB) 115. FIB 115 may be operated using forwarding tables (e.g., in a hardware table like a ternary content addressable memory, FIB 1015 of FIG. 1A).

FIB 115 is configured for performing lookups in tables that may compare certain parameters or features of received packets with entries in the tables, generating output results that determine classifications for respective packets and/or whether certain actions (e.g., forwarding) should proceed (or not proceed). Based upon the lookup(s) in the FIB, the packet may be assigned to flow class 1 and proceed to processing at block 135/module or assigned to flow class 2 and proceed to processing at block 150. The particular flow classes may be based on particular processing tasks to be applied to the packets.

In some embodiments, tasks to be applied to particular flow classes may be identified as likely requiring significant levels of processing capacity from a core (e.g., for encryption/decryption). An offloading module (e.g., a class 1 offload module 140 or a class 2 offload module 155) is instantiated/inserted for managing the cores' workloads and to balance distribution of such processor-intensive tasks. At blocks/modules 130 and 160, processing of a packet flow is offloaded to one of four processor cores (e.g., Core 1, Core 2, etc.). In some embodiments, the initial core selected for offloading is based upon determining the least-loaded core. There may be little information as to how much of a processing load a newly introduced flow class will require compared to other flow classes or how the loads on the various cores will develop over the short term. Thus, the presently least-loaded core may be selected by default to take on the new class of packets.

In some embodiments, it may be determined/estimated how the future processing loads of current classes/flows will develop. For example, it may be determined that another flow class may terminate in the short term and release its assigned core to process other tasks (e.g., based on information obtained from a packet header). Based on such a determination, the core that may soon gain addtional capacity may be selected for processing the new class instead of the currently least-loaded core.

Packets of flow class 1 proceed through an offload module 140 and packets of flow class 2 proceed through an offload module 155. The respective offload modules 130 and 160 and modules 140 and 155 allocate a gate to offload the processing of respective classes of flows (class 1 and class 2) to respective processing cores (processing cores 1, 2, 3, or 4). In some embodiments, processing of a class of packets is initially offloaded to the least-loaded core. In some embodiments, the load of a core is determined by way of a scheduler (e.g., a BESS scheduler) which may return a per-worker array of the number of the total number of packets per second being processed as well as a load value. After a flow is offloaded, the count of packets processed for each class of flow is maintained as well as packets processed by each core.

The core offloading selection is maintained until an offloading module (e.g., module 130/140 and module 155/160) determines that a rebalancing of core allocation should be performed. In some embodiments, a determination is made of whether a core's processing capacity is exceeded by at least a particular amount. In some embodiments, the threshold amount is at least sixty percent of the core's processing capacity.

In some embodiments, a determination is made of whether a flow operating on the core exceeds a threshold proportion of the core's processing capacity and thereby designated an "elephant flow," in which case moving the flow may be highly costly in terms of resetting cache lookups. In some embodiments, this elephant flow threshold is at least one half of the core's processing capacity. If the core's processing threshold is met and the flow class is not designated an "elephant flow," a further determination may be made to assess the impact of reallocating the flow to a different core than the currently assigned core.

In some embodiments, the least loaded core capable of handling the flow is assessed for reassigning a flow. An improvement of at least a predetermined amount in load balance may be required, for example. In some embodiments, the predetermined amount is at least six percent. That is, an estimated reduction in the standard deviation of the resulting load or available (%) processing capacity among the original and newly assigned cores must be at least six percent prior to reassignment. Once an eligible core is chosen, the load of a particular flow may be calculated by dividing the number of packets-per-flow during a time period by the packets-per-worker processed during the same time period. In some embodiments, it may be required that the resulting total load on the new worker core is less than the current total load on the current worker.

After the offloaded processing has been performed, processing of the packets from the flow classes 1 and 2 is finalized, respectively, at blocks/module 145 and 165. Packets received at different ethernet ports, such as at module 120, are processed initially by an assigned core at module 125. Further processing may proceed in modules such as described above with respect to the process beginning at block/module 110.

Figure 2:
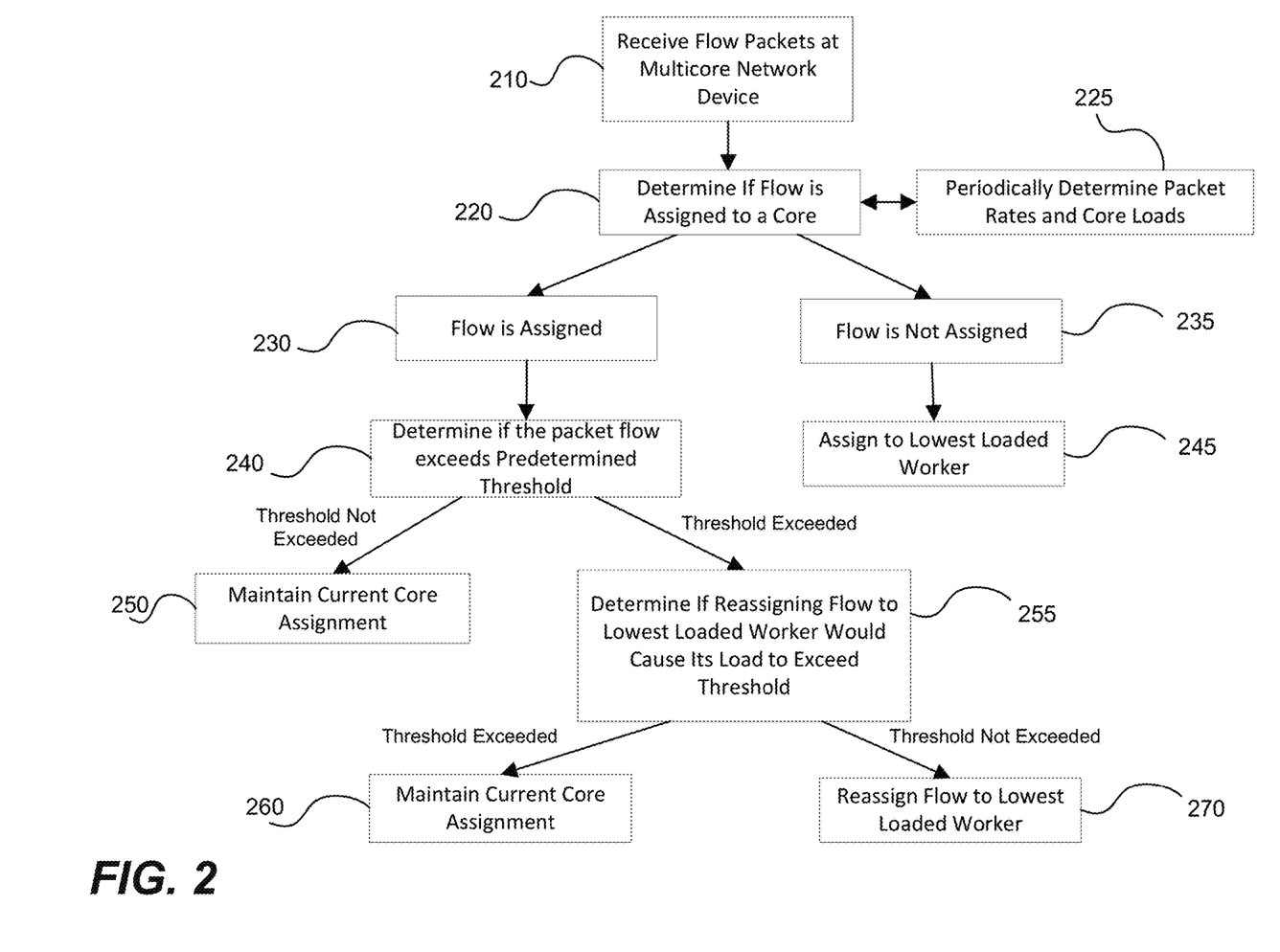
FIG. 2 is a flowchart of offloading network processing tasks among multiple cores in a network device, according to some embodiments.

FIG. 2 is a flowchart of offloading network processing among multiple cores in a network device, according to some embodiments. At block 210, packets are received at a multicore device. A determination is made, at block 220, of which flow class (if any) the packets are assigned to. A count of packets is maintained, including counts associated with identified flow classes. At block 225, a periodic determination of packet/flow rates and core loads is further performed such as further described herein. At block 230, if the identified flow class is assigned to a worker core, a determination is made at block 240 of whether the overall load on the core (or "core load") exceeds or meets a particular threshold and the flow class does not exceed a particular proportion of the core's processing capacity (e.g., is designated an "elephant flow" based upon the counts and loads determined at block 225). In some embodiments, such as described herein, a core load threshold is about 60% or more and a flow load threshold for designation as an "elephant flow" is about 50% or more. If the flow class is not determined to exceed the core load threshold or is determined to be an "elephant flow," the present core assignment for the flow is maintained at block 250.

At block 255, if the threshold for overall core load is met and the flow class is not designated an "elephant flow," a determination of the impact of a reassignment of the flow to the lowest loaded core is made. In some embodiments, prior to reassignment of a flow, a determination is made of whether the new load on the assigned worker would exceed the current load of the current worker core if the reassignment occurred. In some embodiments, reassignment will proceed if the new load was not exceeded and a predetermined amount of improvement in load balancing would be achieved. Other thresholds may be selected for overall core load, elephant flows, and/or load improvement such as based upon the processing capability of the cores, the number of cores, and/or other system features.

At block 260, if the core load resulting from reassignment of the flow class to the lowest loaded worker would exceed a core load threshold level, the reassignment will not occur and the current core assignment for the flow class will be maintained. A cost associated with reassignment with little rebalancing benefit, if any, may thus be avoided. If the core load threshold would not be exceeded, reassignment of the flow class to the lowest loaded worker core is performed at block 270. This way, an improved balancing of processing across cores may result.

At block 235, if a flow class is not assigned to an incoming packet at block 220, a flow class is established to process the packet at block 245 and to process further packets identified as part of the same flow. For example, software-based modules as described with respect to FIG. 1B may be created to process particular flow classes.

Figure 3:
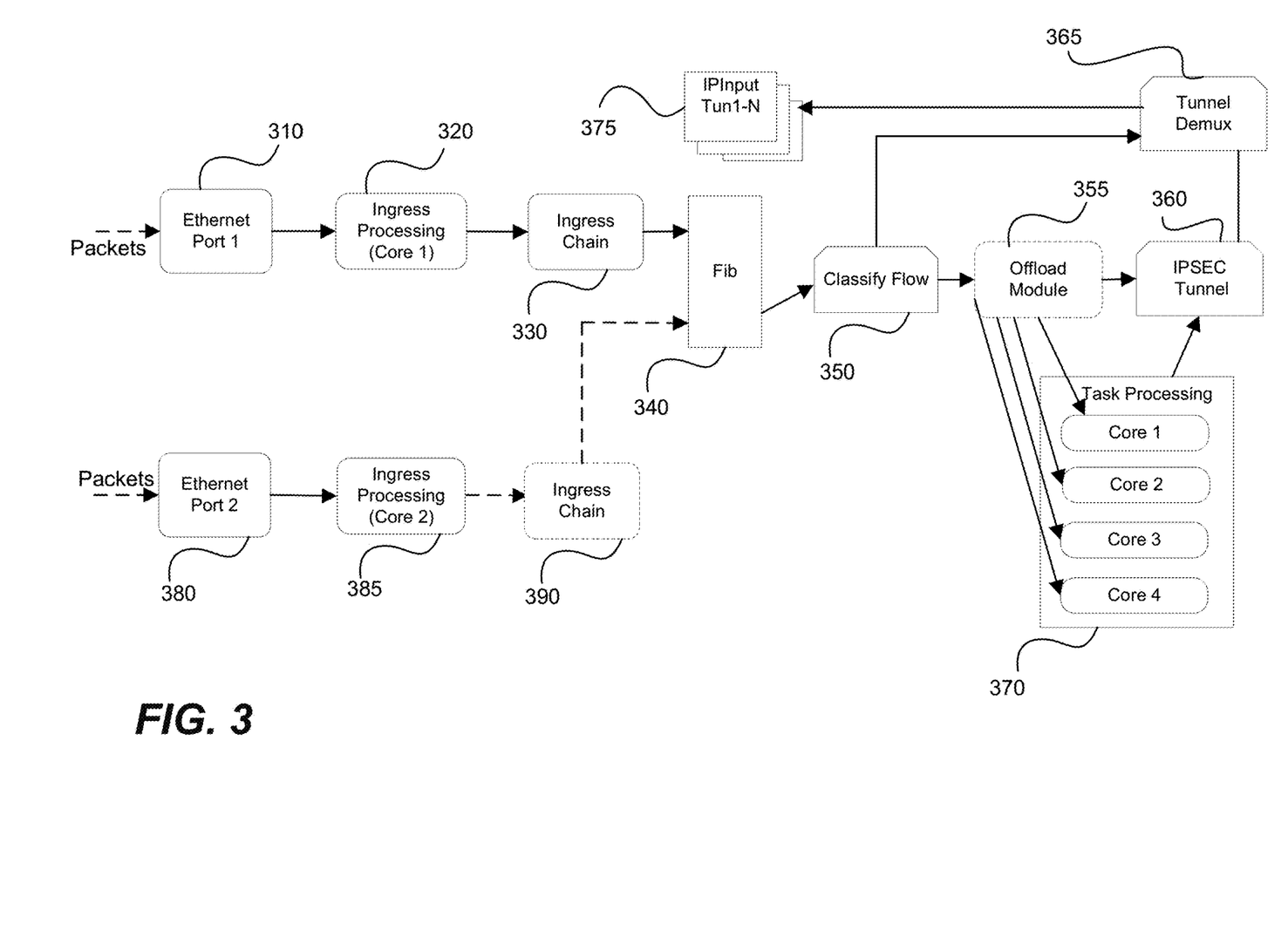
FIG. 3 is a flowchart of offloading decryption processing among multiple cores in a network device, according to some embodiments.

FIG. 3 is a flowchart of offloading decryption processing among multiple cores in a network device, according to some embodiments. The processing is based upon utilizing software-based modules such as described in reference to FIG. 1B. At block/module 310, encrypted packets are received at the ethernet port of a network device and initially processed/handled by a core at block/module 320. An ingress chain module 330 processes the packets and utilizes a FIB table 340. Based upon a lookup in the FIB table 340, the encrypted packet is assigned to a particular decryption flow class at block/module 350.

If a multi-core offloading module is not established for the identified flow, an offloading module 355 is created and inserted between module 350 and an IP security (IPSEC) tunnel interface module 360. Offloading module 355 may initially offload processing of the identified flow to the core (e.g., of cores 1, 2, 3, or 4) identified as the least-loaded core. Processing of tasks are directed to be offloaded at 370 to particular cores by the offloading module 355 and may be processed through downstream modules (e.g., tunnel interface module 360) using the allocated/assigned core. Offloaded tasks may include processor-intensive tasks including decryption. If received packets for the identified flow are not directed to be further offloaded by module 355 (e.g., unencrypted tunnel traffic), then processing is forwarded to a demultiplexer tunnel interface module 365, bypassing additional offloading at 370.

After offloading directs processing of certain tasks (e.g., decrypting) at 370 for the packets processed through an IP security (IPSEC) tunnel interface module 360, packet processing proceeds to demultiplexer module 365. Module 365 may demultiplex multiple streams of secure communications within the processed flow and direct further processing of particular streams to one or more of multiple input tunnel interfaces 375. As described herein, the modules may be generated using a module-based software platform (e.g., BESS).

Packets received at different ethernet ports, such as at port 380, are processed initially by an assigned core at module 385. Further processing may proceed in modules such as an ingress chain module 390 and offloading modules such as described above with respect to the process beginning at block/module 320.

Figure 4:
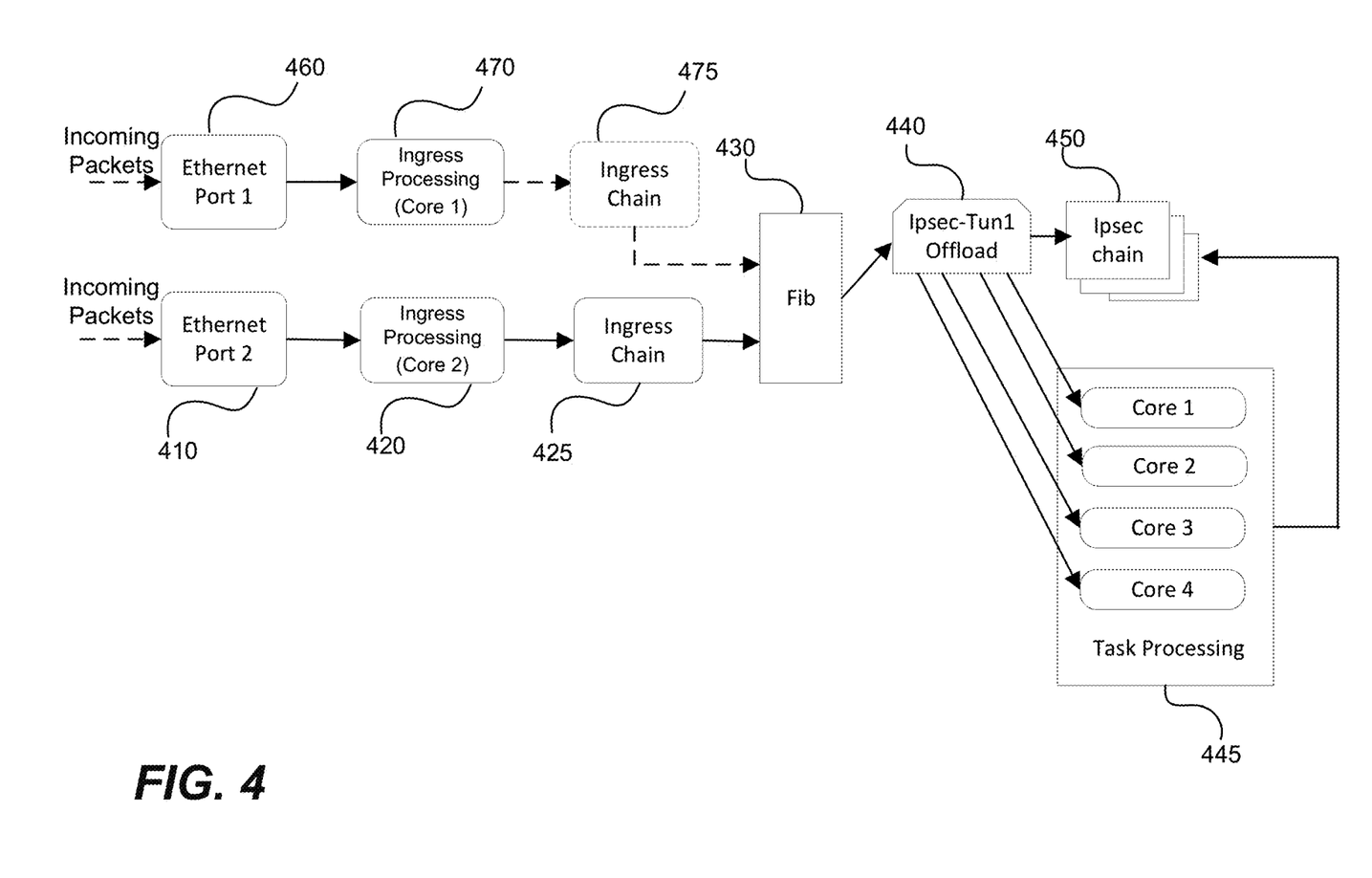
FIG. 4 is a flowchart of offloading encryption processing among multiple cores in a network device, according to some embodiments.

FIG. 4 is a flowchart of offloading encryption processing among multiple cores in a network device, according to some embodiments. As a series of modules for decrypting flows may be implemented such as exemplified with respect to FIG. 3, a series of modules may be deployed for encrypting network flows. At block 410, packets are received at the ethernet port of a network device and initially processed/handled by a core at block/module 420. An ingress chain module 425 processes the packets and utilizes a FIB table 430. Based upon a lookup in the FIB table 430, the packet is assigned to a particular encryption flow class at block/module 440 where an offloading determination/assignment may be made in accordance with embodiments described herein.

Packets are directed for processing through one or more of multiple input tunnel interfaces 450, which may be associated with particular respective streams of secure communications included within the flow of packets. Certain tasks (e.g., encryption) processed through the tunnel interfaces 450 may be performed at block 445 on an assigned core as directed by offloading methods and modules described herein.

Packets received at different ethernet ports, such as at module 460, are processed initially by an assigned core at module 470. Further processing may proceed in modules such as an ingress chain module 475 and offloading modules described above with respect to the process beginning at block/module 420.

Figure 5:
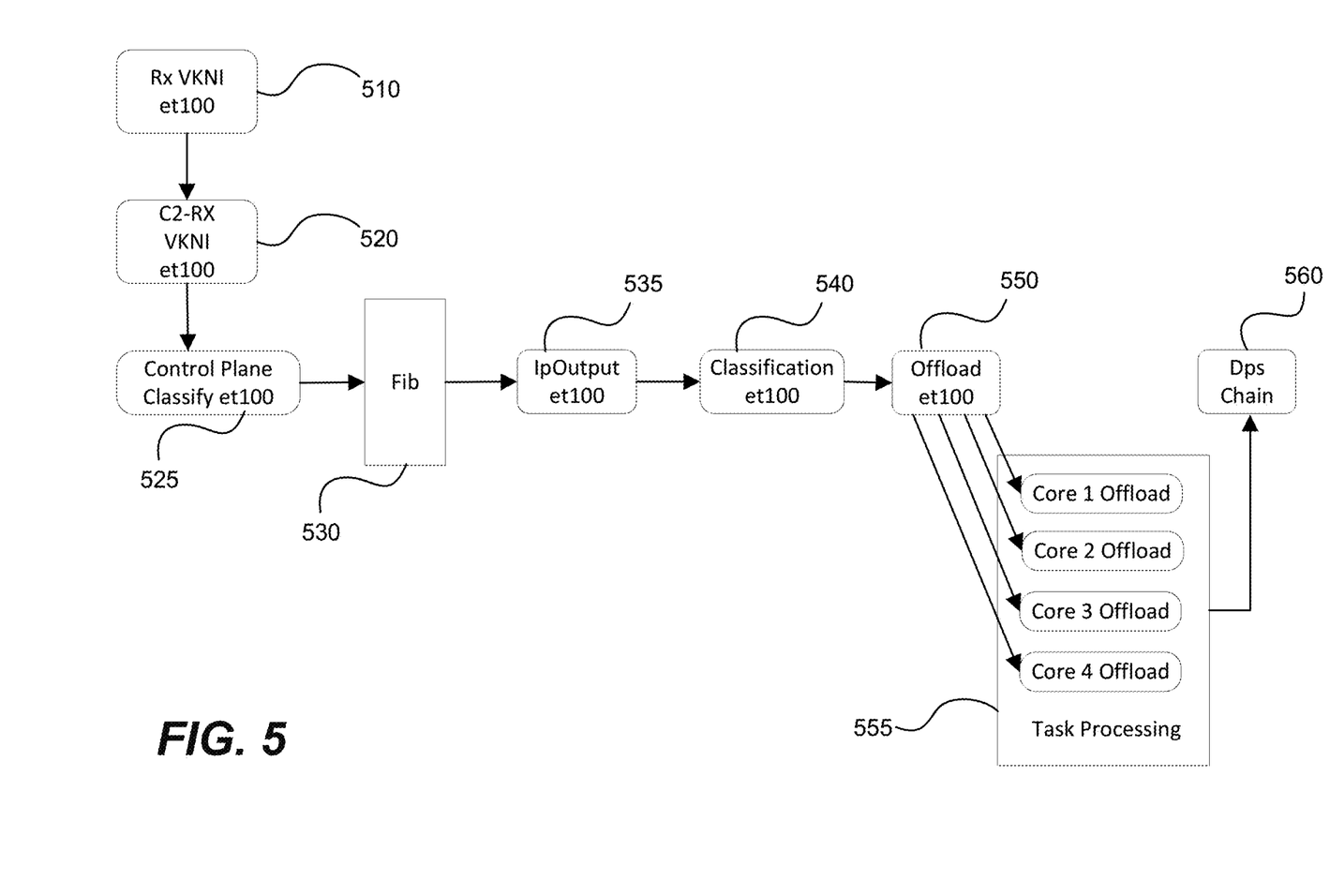
FIG. 5 is a flowchart of offloading encryption processing of control plane traffic among multiple cores in a network device, according to some embodiments.

FIG. 5 is a flowchart of offloading encryption processing of control plane traffic among multiple cores in a network device, according to some embodiments. Kernel traffic is received by a port at block 510. Kernel traffic processing is directed to a module/block 520 utilizing a designated core and a control plane classification module 525. Module 525 directs processing to a block/module 530, including a FIB. Based upon results of lookups in the FIB, processing is directed to an output module 535 and a classification module 540. Based upon a flow classification, an offloading module 550 directs processing of certain tasks (e.g., encryption) among multiple cores at block 555, which may be processed through downstream modules including a Dynamic Path Selection (DPS) chain module 560 used for handling internal network node processing.

Some flow traffic may generally be limited in volume and/or may not be subject to dynamic processing (e.g., through a FIB table). In some embodiments, such flows may be kept inline, processed using a single core (i.e., not offloaded among multiple cores) to avoid flow caching and potential costs of offloading/rebalancing. For example, encryption of direct secure network traffic from a kernel that need not be processed by a FIB may be maintained inline on a single core.

Figure 6:
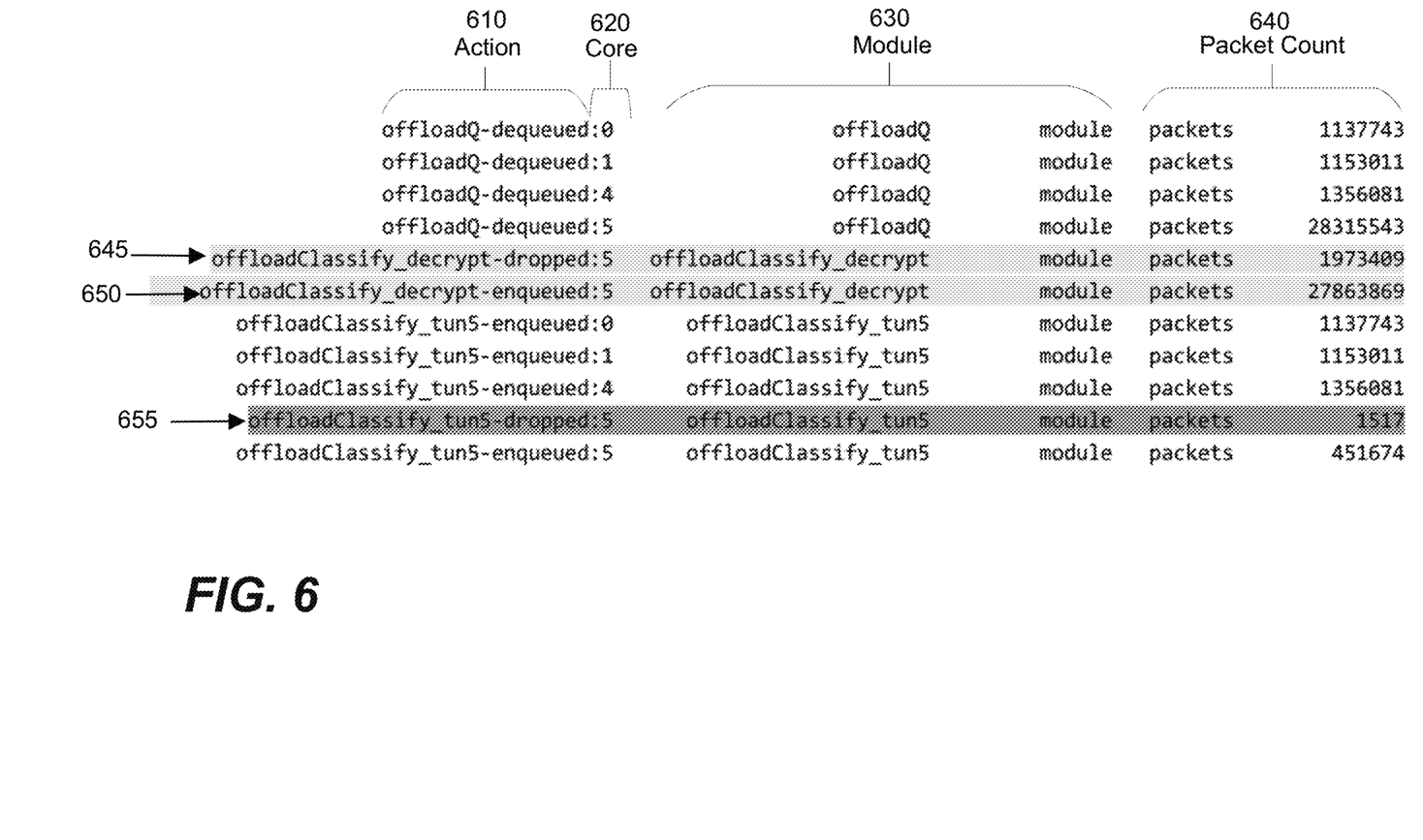
FIG. 6 is a table representing an allocation of network traffic processing across multiple modules and cores of a network device, according to some embodiments.

FIG. 6 is a table representing an allocation of network traffic processing across multiple modules and cores of a network device, according to some embodiments. An action column 610 represents types of offloading actions that occur in a core represented by a column 620. Column 630 represents the module (e.g., a BESS module) in which the action of column 610 occurs. A column 640 represents a count of packets for which the action of column 610 occurred.

The row at 650 represents the number of packets decrypted (column 640) through a module offloading on a particular core (core 5/column 620) and a row at 645 represents the number of packets dropped (column 640) through the same module on the same core as the row at 650. Packet drops in offload may occur because the worker cannot dequeue packets fast enough and the queue overflows. The number of packet drops (at row 645) for the decryption module ("offloadClassify_decrypt") represent about 7% of total packets decrypted (row at 650). Encrypting packets ("offloadClassify_tun5"), originally offloaded to the core id 5, has been distributed/offloaded to other cores (i.e., core IDs 0, 1, 4) in accordance with described embodiments. The resulting number of packets dropped by the encryption module (column at 655) is significantly less of a proportion of total packets decrypted than compared to packets dropped by the decryption module, indicating the effectiveness of the offloading.

Figure 7:
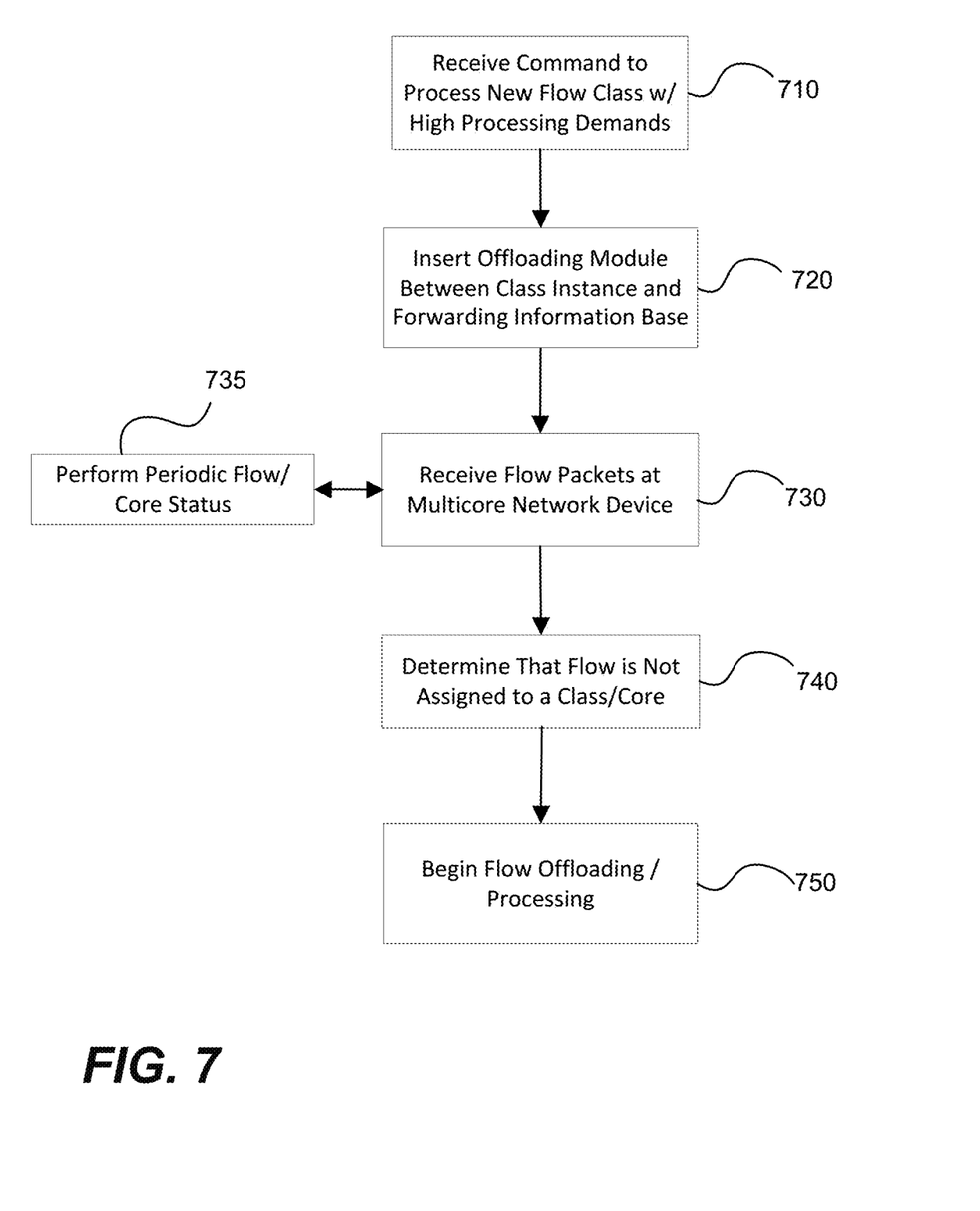
FIG. 7 is a flowchart of generating and inserting a module for offloading network processing, according to some embodiments.

FIG. 7 is a flowchart of generating and inserting a module for offloading network processing, according to some embodiments. As further described herein, offloading of network processing according to some embodiments may be implemented with a software-defined networking (SDN) system such as BESS. At block 710, a network device receives a command to process a type of packet flow/class. The processing may include requirements for a high demand on packet-processing resources (e.g., encryption/decryption).

At block 720, a flow class is assigned for the flow/class (e.g., based upon flow parameters). An instance of an offloading module is inserted in a chain of processing modules for the assigned class (e.g., modules 140, 155, 355, 440, 550 of FIGS. 1, 3, 4, and 5). The offloading module is configured to offload processing of the flow according to the various embodiments described herein.

At block 730, a flow of packets is received at a network device (e.g., switch 1000 of FIG. 1A) and processed by one or more software-implemented modules of an SDN (e.g., as shown and described in reference to FIGS. 1B, 2, 3, 4, and 5). The flow may be processed by a FIB (e.g., FIB module 115 of FIG. 1B) that assists in identifying/classifying packets as being associated with a particular flow and/or flow class (e.g., by performing lookups of particular packet header parameters). In connection with classifying flows, counts of received packets are performed and periodic metrics of packets processed, and respective loads associated with flows and cores are performed at block 735. These metrics may include the number of packets received, processed, and/or dropped for particular flow classes and cores.

At block 740, a determination is made that the flow is not yet assigned by the network device to a particular class/flow for processing and/or not assigned/offloaded to a core for processing. At block 750, packets for the identified flow class begin to be processed by the network device(s)' offloading module. The offloading module is configured to offload processing of the packets according to the various embodiments described herein. The offloading module may further reassign the flow to cores of a multi-core system based, for example, on flow/core status data received at block 735 and as further described herein.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for processing network flows in a multi-core network device, the method comprising:
   receiving a packet flow at the multi-core network device having a plurality of worker cores;
   periodically determining a packet rate of the packet flow and a processing load on each of the plurality of worker cores;
   determining if the packet flow is currently assigned to one of the plurality of worker cores;
   in response to determining that the packet flow is not assigned, assigning the packet flow to a worker core that has the lowest processing load among the plurality of worker cores; and
   in response to determining that the packet flow is currently assigned and that the determined packet rate exceeds a particular threshold of the processing capacity of the currently assigned worker core:
      determining which of the plurality of worker cores has the lowest load;
      determining if reallocating the packet flow to the lowest loaded worker core would cause the load on the lowest loaded worker core to exceed the current load on the currently assigned worker core; and
      in response to determining that reallocating the packet flow would not cause the load on the lowest loaded worker core to exceed the current load on the currently assigned worker core, reallocating the packet flow to the lowest loaded worker core.

2. The method of claim 1 wherein the multi-core network device is programmed and configured to operate using a modular software architecture, the method further comprising:
   generating an instance of an offloading module adapted for processing a particular class of flow; and
   inserting the instance into a chain of modules in the modular software architecture, wherein the offloading module performs said reallocating of the packet flow.

3. The method of claim 2 wherein the instance of the offloading module is inserted such that an input of the module is connected between an output of a forwarding information base (FIB) module and an input to a module configured for processing the particular class of flow.

4. The method of claim 2 wherein the particular class of flow is at least one of an IP security (ipsec) decryption or ipsec encryption flow.

5. The method of claim 4 wherein the particular class of flow is restricted to non-control-plane flows.

6. The method of claim 2 wherein the modular software architecture is based upon a Berkeley Extensible Software Switch (BESS).

7. The method of claim 1 wherein the particular threshold of the processing capacity is between 50 and 60 percent.

8. The method of claim 1 wherein the determining the packet rate of the packet flow and the processing load on each of the worker cores periodically occurs between every 10 to 60 seconds.

9. The method of claim 1 wherein the reallocating the packet flow to the lowest loaded worker core is further in response to estimating that a relative difference in loads between the lowest loaded worker core and the currently assigned core is reduced by at least a minimum threshold.

10. The method of claim 9 wherein the minimum threshold is six percent of processing capacity.

11. A system for processing network flows in a multi-core network device, the system comprising:
one or more processors programmed and configured to perform:
receiving a packet flow at the multi-core network device having a plurality of worker cores;
periodically determining a packet rate of the packet flow and a processing load on each of the plurality of worker cores;
determining if the packet flow is currently assigned to one of the plurality of worker cores;
in response to determining that the packet flow is not assigned, assigning the packet flow to a worker core that has the lowest processing load among the plurality of worker cores; and
in response to determining that the packet flow is currently assigned and that the determined packet rate exceeds a particular threshold of the processing capacity of the currently assigned worker core:
determining which of the plurality of worker cores has the lowest load;
determining if reallocating the packet flow to the lowest loaded worker core would cause the load on the lowest loaded worker core to exceed the current load on the currently assigned worker core; and
in response to determining that reallocating the packet flow would not cause the load on the lowest loaded worker core to exceed the current load on the currently assigned worker core, reallocating the packet flow to the lowest loaded worker core.

12. The system of claim 11 wherein the one or more processors are further programmed and configured with a modular software architecture to:
generate an instance of an offloading module adapted for processing a particular class of flow; and
insert the instance into a chain of modules in the modular software architecture, wherein the offloading module performs the reallocating of the packet flow.

13. The system of claim 12 wherein the instance of the offloading module is inserted such that an input of the module is connected between an output of a forwarding information base (FIB) module and an input to a module configured for processing the particular class of flow.

14. The system of claim 12 wherein the particular class of flow is at least one of an IP security (ipsec) decryption or ipsec encryption flow.

15. The system of claim 14 wherein the particular class of flow is restricted to non-control-plane flows.

16. The system of claim 12 wherein the modular software architecture is based upon a Berkeley Extensible Software Switch (BESS).

17. The system of claim 11 wherein the particular threshold of the processing capacity is between 50 and 60 percent.

18. The system of claim 11 wherein the determining the packet rate of the packet flow and the processing load on each of the worker cores periodically occurs every 10 to 60 seconds.

19. The system of claim 11 wherein the reallocating the packet flow to the lowest loaded worker core is further in response to estimating that a relative difference in loads between the lowest loaded worker core and the currently assigned core is reduced by at least a minimum threshold.

20. The system of claim 19 wherein the minimum threshold is six percent of processing capacity.

* * * * *